United States Patent
Vu et al.

(10) Patent No.: US 6,249,719 B1
(45) Date of Patent: Jun. 19, 2001

(54) APPLICATIONS AND METHODS FOR VOLTAGE INSTABILITY PREDICTOR (VIP)

(75) Inventors: Khoi Tien Vu, Apex; Danny E. Julian, Willow Spring, both of NC (US); Jan Ove Gjerde, Oslo (NO); Murari M. Saha, Västerås (SE)

(73) Assignee: ABB Power T&D Company, Inc., Raleigh, NC (US)

( * ) Notice: Subject to any disclaimer, the term of this patent is extended or adjusted under 35 U.S.C. 154(b) by 0 days.

(21) Appl. No.: 09/333,185

(22) Filed: Jun. 14, 1999

Related U.S. Application Data

(63) Continuation-in-part of application No. 09/079,983, filed on May 15, 1998.

(51) Int. Cl.⁷ .................................................. G05D 5/00
(52) U.S. Cl. ...................................... 700/292; 700/286
(58) Field of Search .................................. 700/294, 292, 700/295, 286, 293

(56) References Cited

U.S. PATENT DOCUMENTS

| | | | |
|---|---|---|---|
| 5,566,085 | * 10/1996 | Marceau et al. | 364/492 |
| 5,642,000 | * 6/1997 | Jean-Jumeau et al. | 307/31 |
| 5,745,368 | * 4/1998 | Ejebe et al. | 364/483 |
| 5,963,022 | * 10/1999 | Buda et al. | 323/212 |

OTHER PUBLICATIONS

Use of Local Measurements to Estimate Voltage–Stability Margin By Khoi Vu, Miroslav M. Begovic, Damir Novosel, Murari Mohan Saha, May 1997.*

Barbier, C. et al., "An Analysis of Phenomena of Voltage Collapse on a Transmission System", *Revue Generale de l'Electricite*, 1980, 89(10), 672–690 (English Summary Included).

Begovic, M. et al., "Control of Voltage Stability Using Sensitivity Analysis", *IEEE Trans PWRS*, Feb. 1992, 7(1), 114–123.

Kessel, P. et al., "Estimating the Voltage Stability of a Power System", *IEEE Trans PWRD*, Jul. 1986, PWRD–1(3), 346–354.

Novosel et al., "Practical Protection and Control Strategies During Large Power–System Disturbances", *IEEE T&D Conf. Proceedings*, Los Angeles, Sep. 15–20, 1996.

Ohtsuka, K. et al., "An Equivalent of Multi–machine Power Systems and Its Identification for On–Line Application to Decentralized Stabilizers", *IEEE Trans. PWRS*, Feb. 1989, 4(2), 687–693.

Proceedings of the IEEE, Special Issue on Nonlinear Phenomena in Power Systems, Nov. 1995.

Proceedings of Bulk Power System Voltage Phenomena–III: Voltage Stability, Security and Control, Davos, Switzerland, Aug. 1994.

(List continued on next page.)

*Primary Examiner*—Bipin Shalwala
*Assistant Examiner*—Nitin Patel
(74) *Attorney, Agent, or Firm*—Woodcock Washburn Kurtz Mackiewicz & Norris LLP

(57) ABSTRACT

A Voltage Instability Predictor (VIP) estimates the proximity of a power system to voltage collapse in real time. The VIP can be implemented in a microprocessor-based relay whose settings are changed adaptively to reflect system changes. Only local measurements (voltage and current) at the bus terminal are required. The VIP detects the proximity to collapse by monitoring the relationship between the apparent impedance $\bar{Z}_{app}$ and the Thévenin-impedance. In addition, we disclose: (1) that the VIP may be used in connection with non-radial topologies; (2) a new, more robust method to track voltage collapse in terms of impedance using rolling sums; and (3) a new method for representing distance to voltage collapse in terms of power margins.

18 Claims, 10 Drawing Sheets

Thevenin equivalent of system

OTHER PUBLICATIONS

Taylor, C.W., Power System Voltage Stability, McGraw Hill, 1994.

Tuan, T. et al., "Emergency Load Shedding to Avoid Risks of Voltage Instability Using Indicators", *IEEE Trans. PWRS*, Feb. 1994, 9(1), 341–351.

Vu, K. et al., "Voltage Instability: Mechanisms and Control Strategies", *Proc. of IEEE*, Nov. 1995, 83(11), 1442–1455.

Vu, K. et al., "Grids Get Smart Protection and Control", *IEEE Comp. Appl. Power*, 1997, 40–44.

Vu, K. et al., "Use of Local Measurements to Estimate Voltage–Stability Margin", *IEEE*, 1997, 318–323.

Yabe, K. et al., "Conceptual Designs of A1–based Systems for Local Prediction of Voltage Collapse", *IEEE PWRS*, Feb. 1996, 11(1), 181–188.

IEEE Power Systems Relaying, Committee, Working Group K12, "Voltage Collapse Mitigation", 1995.

* cited by examiner

Voltage @ bus 23 and its adaptive setpoint

MVAR: sending/recieving for Bus 23

APPLICATIONS AND METHODS FOR VOLTAGE INSTABILITY PREDICTOR (VIP)

CROSS-REFERENCE TO RELATED APPLICATION

This is a continuation-in-part of U.S. patent application Ser. No. 09/079,983, filed May 15, 1998, entitled "Voltage Instability Predictor (VIP)—Method And System For Performing Adaptive Load Shedding to Improve Voltage Stability in Power Systems" (the '983 application), which is hereby incorporated by reference in its entirety.

FIELD OF THE INVENTION

The present invention relates generally to power systems and protective relays employed therein, and more particularly to new applications and methods of the Voltage Instability Predictor (VIP) disclosed in the '983 application.

BACKGROUND OF THE INVENTION

Voltage instability is closely related to the notion of maximum loadability of a transmission network. In present-day power systems, this may take place as a precursor to the traditional frequency instability problem (see Proceedings of Bulk Power System Voltage Phenomena-III: "Voltage Stability, Security and Control," Davos, Switzerland, August 1994; and K. Vu, et al., "Voltage Instability: Mechanisms and Control Strategies," Proc. of IEEE, Special Issue on Nonlinear Phenomena in Power Systems, pp. 1442–1455, November 1995). It is critical for the utility company to track how close the transmission system is to its maximum loading. If the loading is high enough, actions have to be taken to relieve the transmission system.

A problem associated with tracking the maximum loading of the transmission system is that such maximum loading is not a fixed quantity, but rather depends on the network topology, generation and load patterns, and the availability of VAR resources. All of these factors can vary with time due to scheduled maintenance, unexpected disturbances, etc.

Despite the fact that voltage instability is a system problem, there is still a need for relays that process only local measurements. These relays are to be counted upon when other controls cannot mitigate the situation; they also form the fall-back position for any global protection scheme when communication channels fail. Controls that use only local data provide an attractive approach because they are low cost and simple to build. The most common form is to shed load based on voltage level—under-voltage load shedding. This scheme has been attempted on the Pacific Northwest system, as reported by C. W. Taylor, "Power System Voltage Stability," McGraw Hill, 1994. However, for many other systems, the difficulty with choosing the setpoint poses a challenge. In fact, voltage is often a poor indicator of instability, and a fixed setpoint may result in unnecessary shedding or failure to recognize an instability. Some systems may ride through voltages much below the setpoint of the relay but, for others, the voltage can appear normal even though the grid is on the verge of instability. The idea of using an adjustable voltage setpoint has been known, as reported in IEEE Power Systems Relaying, Committee, Working Group K12, Voltage Collapse Mitigation, 1995.

The true goal of a local relay should be to determine whether the load connected to the substation is excessive. A fundamental issue here is whether the transmission system's strength can be "sensed" from local measurements. It has been well known that conventional, local quantities such as voltage level and reactive reserve are poor indicators of voltage instability, and therefore advanced methods are needed. For example, the use of artificial intelligence on local measurements is disclosed in K. Yabe, et al., "Conceptual Designs of AI-based Systems for Local Prediction of Voltage Collapse," IEEE 95 WM 181-8 PWRS. The idea is to simulate a range of system conditions to generate patterns in local observations. In the real environment, true measurements are then compared against known patterns, from which the proximity to collapse is inferred.

The Voltage Instability Predictor

As mentioned, the present application is a continuation-in-part of the '983 application, which discloses a Voltage Instability Predictor, or VIP, that estimates the strength/weakness of a transmission system based on local voltage and current measurements, and compares that with the local demand. The closer the local demand is to the estimated transmission capacity, the more imminent is the voltage instability. This information is used for load shedding as well as other applications.

The operation of the VIP may be summarized as follows: Current and voltage waveforms are measured at the bus, and then current and voltage phasors are derived. Based on the phasors, an apparent impedance associated with the load and a Thévenin impedance associated with the source are determined. The Thévenin impedance and apparent impedances are then compared. The VIP decides whether to initiate a prescribed action, such as load shedding and/or controlling on-load tap-changing (OLTC) transformers, based on the relationship of the apparent impedance to the Thévenin impedance. Further details of the VIP are provided below.

SUMMARY OF THE INVENTION

A Voltage Instability Predictor (VIP) in accordance with the present invention estimates the proximity of a power system to voltage collapse in real time. The VIP can be implemented in a microprocessor-based relay whose settings are changed adaptively to reflect system changes. Only local measurements (voltage and current) at the bus terminal are required. The VIP can detect the proximity to collapse in a number of ways, including by monitoring the relationship between the apparent impedance $\overline{Z}_{app}$ and the Thévenin-impedance, and by using "power margins." The VIP may be used in connection with radial and non-radial topologies. Moreover, a robust method for tracking voltage collapse in terms of impedance using rolling sums is provided.

In one preferred implementation of the invention, a method for protecting an electrical power system comprises measuring current and voltage phasors at a point on the system; based on the current and voltage phasors, determining an apparent impedance ($\overline{Z}_{app}$) associated with a load region and a Thévenin impedance ($\overline{Z}_{Thev}$) associated with a source region; comparing the Thévenin impedance and apparent impedances; and deciding whether to initiate a prescribed action based on the relationship of the apparent impedance to the Thévenin impedance.

In an alternative implementation, a method for protecting an electrical power system comprises measuring current and voltage at a point on the system; based on the current and voltage measurements, determining a Thévenin impedance associated with a source region, and determining a power margin in accordance with a prescribed formula; and deciding whether to initiate a prescribed action based on the power margin. In this method, the power margin may be determined in accordance with the following process: obtaining data representing voltage and current at a plurality of points in time; determining the power observed at the present time; forecasting a maximum available power at a future time, based on the plurality of data points; computing a difference between the forecasted maximum available power and the observed current power; and defining the power margin based on the computed difference.

Other features of the present invention are disclosed below.

DETAILED DESCRIPTION OF PREFERRED EMBODIMENTS

In Section A below, for the sake of completeness, we repeat the description of the VIP as set forth in the '983 application. In Section B, we describe several new applications of, and methods for use in, the VIP. These include (1) application of the VIP in connection with non-radial topologies; (2) a method for tracking voltage collapse in terms of impedance using rolling sums; and (3) a method for representing distance to voltage collapse in terms of power margins. In connection with topic (1) above, we define a "radial" topology as a topology or configuration in which there is only one path from the source to the point of interest (e.g., the load). A "non-radial" or meshed topology is where there are multiple paths.

A. Voltage Instability Predictor

1. Overview

Figure 1:
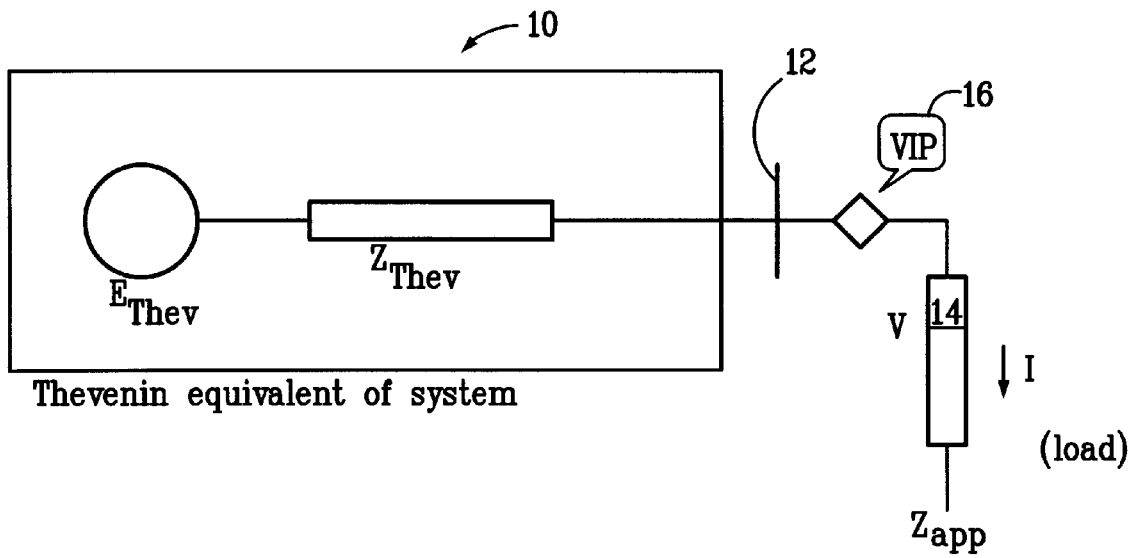
FIG. 1 schematically depicts an electrical energy transmission system in accordance with the present invention.

Consider the problem of tracking how close the loading at a bus is to the limit of a transmission system. Voltage instability occurs when the loading reaches this limit. For the problem at hand, the system is represented as a Thévenin equivalent 10, as shown in FIG. 1. The local bus 12, load 14 and local relay 16 are also shown in FIG. 1. The Thévenin equivalent comprises a source voltage $E_{Thev}$ and impedance $Z_{Thev}=R_{Thev}+jX_{Thev}$.

The following power-flow equation ties the voltage $\overline{V}$ at the load bus to the power demand P+jQ.

$$\frac{P+jQ}{\overline{V}} = \overline{I}^* = \left(\frac{\overline{E}-\overline{V}}{\overline{Z}_{Thev}}\right)^* \Rightarrow (P+jQ)\cdot \overline{Z}^*_{Thev} = (\overline{V}(\overline{E}-\overline{V}))^*$$

For a given power transfer P+jQ, the above equation admits at most two voltage solutions $\overline{V}$. Maximal power transfer is reached when the two solutions coincide, i.e., when $$\overline{V} = (\overline{E}-\overline{V})^*.$$

Plugging in the apparent impedance, $\overline{Z}_{app}$, we see that maximal power transfer occurs when, $$\overline{Z}_{app}\overline{I} = (\overline{Z}_{Thev}\overline{I})^* \text{ or}$$

$$\overline{Z}_{app} = \overline{Z}^*_{Thev} \times 1\angle -2\delta_I.$$

Figure 2:
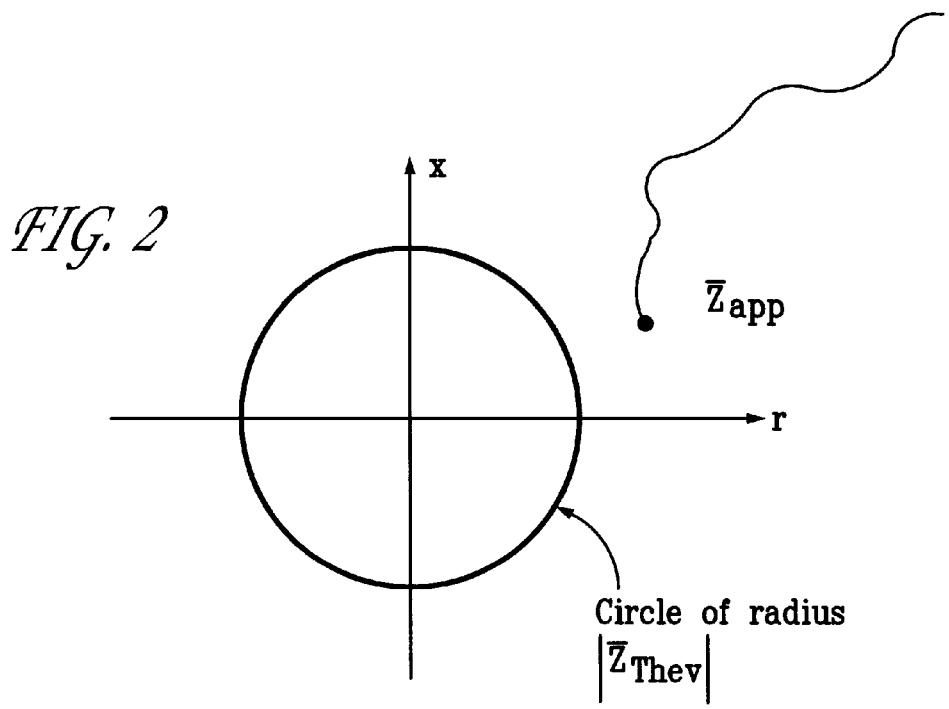
FIG. 2 depicts an exemplary graph of a Thévenin impedance circle in the impedance plane and is referred to below in explaining that maximal power transfer, and thus voltage instability, occurs when the apparent impedance of the load intersects (or approaches a region surrounding) the Thévenin impedance circle.

Since the angle $\delta_I$ could be any number between 0 and $2\pi$, it follows that maximal power transfer occurs when $\overline{Z}_{app}$ is on the circle centered at 0 and of radius $|\overline{Z}_{Thev}|$. Thus, the proximity of $\overline{Z}_{app}$ to the $\overline{Z}_{Thev}$ circle indicates proximity to voltage instability. This analysis is depicted in FIG. 2.

1.1 Adaptive Load-Shedding Relay

The relay logic is quite simple and involves checking how close $\overline{Z}_{app}$ is to the $\overline{Z}_{Thev}$ circle. $\overline{Z}_{app}$, being the apparent impedance of the load, is readily available from local measurements. It is the tracking of the Thévenin impedance $\overline{Z}_{Thev}$ that makes the relay adaptive. The Thévenin impedance can be obtained via a parameter-estimation process. The fundamental equation that ties $\overline{Z}_{Thev}$ to $\overline{Z}_{app}$ is:

$$|\overline{Z}_{Thev} + \overline{Z}_{app}| \times I = E_{Thev}$$

or, $$(R_{Thev}+r_{app})^2 + (X_{Thev}+x_{app})^2 = E^2_{Thev}/I^2$$

In the above equation, the three unknowns are $R_{Thev}$, $X_{Thev}$ and $E_{Thev}$ and the set of measurements is $\{r_{app}, x_{app}, I\}$. If three or more measurement sets are acquired, the equation can be solved for the unknowns.

1.2 Comparison With Existing Practices

Even though existing under-voltage relays are in wide use throughout the world, their settings are very difficult to select. Some systems have a setting of 0.95 p.u., but quite often a voltage falling below this level is still operable whereas, at other times, the system may collapse at voltages above the setpoint. Below and in FIG. 3, we explain why this happens and why the VIP is robust against such problems.

Suppose that the Thévenin equivalent is fixed at 1.05 p.u. and the voltage threshold for load shedding at the local bus is set at 0.95 p.u. We try to map this to the impedance diagram.

$$\frac{|-\bar{Z}_{app} - \bar{Z}_{Thev}|}{|-\bar{Z}_{app}|} = \frac{|\bar{E}|}{|\bar{V}|} = \frac{1.05}{0.95} = 1.105$$

Figure 3:
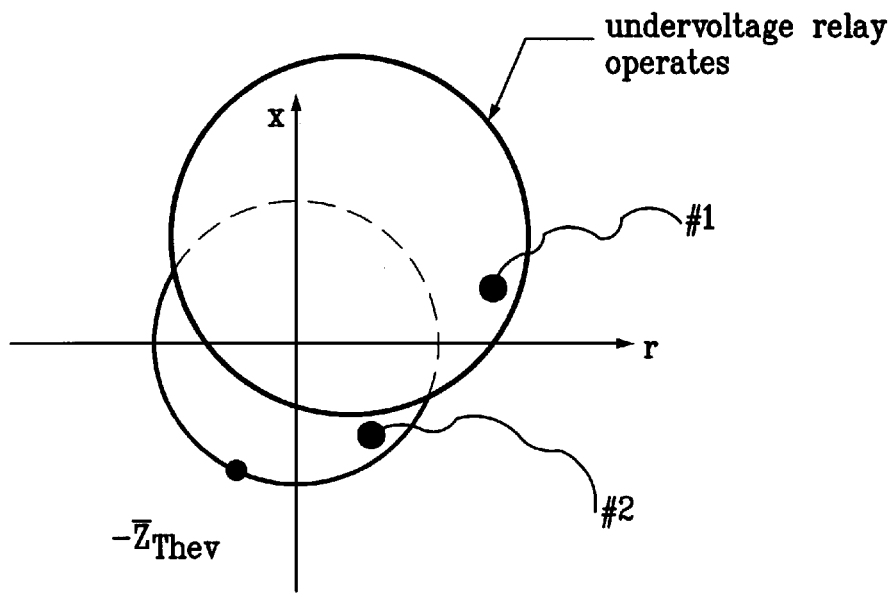
FIG. 3 is a graph that is referred to below in contrasting the operation of a relay employing a VIP with that of a conventional undervoltage relay.

That is, voltage instability is perceived by the relay when the distance between $\bar{Z}_{app}$ and $-\bar{Z}_{Thev}$ is more than 1.105 the distance separating $\bar{Z}_{app}$ and 0. The locus of all such $\bar{Z}_{app}$ points is itself a circle, as illustrated in FIG. 3. The undervoltage locus does not coincide with the true voltage instability region, which can result in misoperation. For example, Trajectory #1 enters the operating region of the relay and may result in load shedding if the wait time has expired. On the other hand, Trajectory #2 has entered the voltage instability region but the condition is not recognized by the undervoltage relay.

2. Detailed Discussion of VIP

FIG. 1, as mentioned, depicts a load bus and the rest of the system treated as a Thévenin equivalent. Equating the receiving and sending currents, one has (note that the subscript "Thev" has been dropped from $\bar{E}$):

$$\frac{P+jQ}{\bar{V}} = \bar{I}^* = \left(\frac{\bar{E}-\bar{V}}{\bar{Z}_{Thev}}\right)^* \quad (1)$$

$$(P+jQ)\cdot \bar{Z}_{Thev}^* = \bar{V}(\bar{E}-\bar{V})^*$$

For a given power transfer P+jQ, the phasor equation (1), which is quadratic, admits at most two voltage solutions $\bar{V}$. Observe the symmetry in equation (1); that is, if $\bar{V}$ is one solution then the other solution can be found simply by computing $(\bar{E}-\bar{V})^*$. The two solutions become one (i.e., bifurcation) at maximal power transfers; a further increase in power demand will yield no solution.

In summary, maximal power transfer occurs when $$\bar{V}=(\bar{E}-\bar{V})^* \quad (2)$$

Plugging in the apparent impedance reveals that maximal power transfer occurs when, $$\bar{Z}_{app}\bar{I}=(\bar{Z}_{Thev}\bar{I})^* \quad (3)$$

or simply, $$|\bar{Z}_{app}|=|\bar{Z}_{Thev}|. \quad (4)$$

It is noted that no assumption has been made about the characteristic of the load. The apparent impedance $\bar{Z}_{app}$ is merely the ratio between the voltage and current phasors measured at the bus 12 (FIG. 1). Relation (4), holding true regardless of the load characteristic, separates the impedance plane into two regions as shown in FIG. 2. As the load varies, $\bar{Z}_{app}$ traces a path in the plane and voltage instability occurs, in the steady-state sense, when $\bar{Z}_{app}$ crosses the Thévenin circle.

Tracking closeness to voltage instability, therefore, can be accomplished by tracking the distance of the present-time $\bar{Z}_{app}$ to the Thévenin circle. This circle is by no means a fixed object since it represents the entire system lumped together. Such collection involves thousands of devices, any of which can change at a given time. It is more likely in a situation of voltage instability that the circle will expand (transmission becoming weaker) and the impedance $\bar{Z}_{app}$ will move toward the circle (load becoming heavier). (A weakened transmission and increased loading are two common symptoms of voltage collapse.) The VIP tracks the Thévenin impedance and uses it as the reference for voltage stability. This idea was suggested briefly in D. Novosel et al., "Practical Protection and Control Strategies During Large Power-System Disturbances," IEEE T&D Conf. Proceedings, Los Angeles, Sep. 15–20, 1996.

The following observations can be made in view of the foregoing:

1. Relation (4) can be found in various forms in textbooks on basic circuit theory. Its connection to voltage collapse has been addressed in early works in the field, such as C. Barbier and J. Barret, "An Analysis of Phenomena of Voltage Collapse on a Transmission System," Revue Generale de l'Electricite, pp. 672–690; and P. Kessel and H. Glavitsch, "Estimating the Voltage Stability of a Power System," IEEE Trans. PWRD, July 1986, pp. 346–354. In particular, Kessel and Glavitsch derived a condition similar to (2) and used it as the basis for a voltage-collapse index. French researchers demonstrated the potential of this index (L-index) in their load-shedding scheme described in T. Tran et al., "Emergency Load Shedding to Avoid Risks of Voltage Instability Using Indicators," IEEE Trans. on PWRS, February 1994, pp. 341–351. L-indices, as well as other competing indices (see an overview in K. Vu, et al., "Voltage Instability: Mechanisms and Control Strategies," cited above), require that the network information be known (topology, loads, generators, etc.). Therefore, they can only be implemented at the control center with communication links to the substations. The inventive method disclosed herein has its own merit and is unique because it is tailored for relay applications and involves only local measurements.

2. In a dynamic power-system model, voltage collapse can occur before the maximum power transfer (e.g., as discussed in Proceedings of the IEEE, Special Issue on Nonlinear Phenomena in Power Systems, November 1995). However, due to practical considerations, it is necessary to base a design on simplified system models.

2.1 Tracking the Thévenin Equivalent

Tracking the Thévenin equivalent is essential to detection of voltage collapse. There are many methods to track the Thévenin parameters. The use of a Kalman filter is discussed in K. Ohtsuka et al., "An Equivalent of Multi-machine Power Systems and Its Identification for On-Line Application to Decentralized Stabilizers," IEEE Trans. on PWRS, February 1989, pp. 220–228, in connection with the problem of out-of-step protection ($R_{Thev}$ was assumed zero). In this specification, we apply the traditional curve-fitting technique. We base the tracking on the following equation:

$$\bar{E}=\bar{V}+\bar{Z}_{Thev}\bar{I} \quad (5)$$

Denote $\bar{E}=E_r+jE_i$, $\bar{V}=u+jw$ and $\bar{I}=g+jh$. Equation (5) can be rewritten as:

$$\begin{bmatrix} 1 & 0 & -g & h \\ 0 & 1 & -h & -g \end{bmatrix} \times \begin{bmatrix} E_r \\ E_i \\ R_{Thev} \\ X_{Thev} \end{bmatrix} = \begin{bmatrix} u \\ w \end{bmatrix}$$

Note that g, h, u and w are directly available from the measurements at the local bus. The unknowns are $R_{Thev}$, $X_{Thev}$ and $E_r$ and $E_i$. Clearly, measurements taken at two or more different times are required to solve for the unknowns. In a real environment, measurements are not precise and the Thévenin parameters drift due to the system's changing conditions. To suppress oscillations, a larger data window should be used. The estimation therefore attempts to minimize the error in a least-squares sense. The discussion here is to demonstrate the new relay method. Toward actual implementation, attention will be paid to practical issues such as data memory, window size, noise in measurements, close-by faults, and so on.

2.2 Numerical Examples

The standard IEEE 39-bus system is chosen for the exemplary system. To simulate voltage collapse, the demand at each of the load buses is gradually increased until the power-flow equations become unsolvable. For illustration, the same percentage of load increase is used for all loads. The critical percentage is 163.4%.

A relay incorporating a monitoring device, or VIP, is placed at each load bus to process the local measurements (bus voltage and load current) based on a least-squares fitting and a moving window. The monitoring device's output is a stream of Thévenin parameters (as a function of time). Note that each monitoring device has access to the local information only and is unaware of the changes that take place in the rest of the network. Those changes can involve load increases at other buses and generators reaching reactive limits.

The ability to track the Thévenin parameters is a numerical issue and is only part of the picture. The other part, even more important, is to check whether the estimated Thévenin impedance always merges with the load impedance at the point of collapse. That is, the main purpose of the numerical examples is to verify the theoretical condition of equation (4) in a multi-node network.

Figure 4:
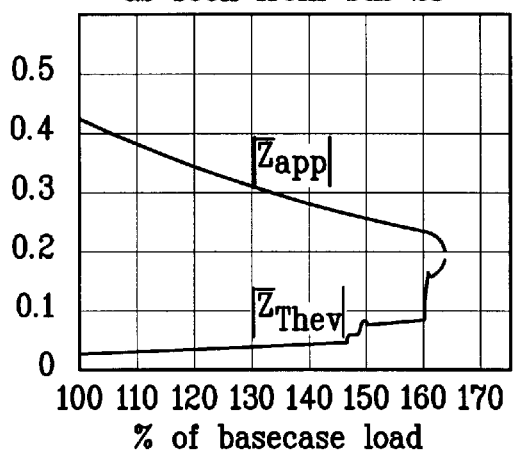
FIG. 4 is an exemplary graph of Thévenin impedance magnitude and load impedance magnitude versus percent of base-case load, for a base-case load=247.5+j84.6 MVA.

FIG. 4 depicts the variation in the local apparent impedance $|\bar{Z}_{app}|$ at bus #23 and the Thévenin impedance $|\bar{Z}_{Thev}|$ seen from this bus. Note that only the magnitudes of these impedances are plotted since the concern here is to verify equation (4). The load increase is evident by a decaying load-impedance profile. The Thévenin impedance increases slightly until the load level reaches 145%, after which there occur a number of sharp rises (at 146%, 149%, 160% and beyond). A check with a power-flow solver reveals that these points coincide with individual generators reaching their respective reactive limits.

It is clear from FIG. 4 that the two impedances, Thévenin ($|\bar{Z}_{Thev}|$) and load ($|\bar{Z}_{app}|$), come together at the point of collapse. They do not become exactly equal because the Thévenin value is estimated and thus lags the true value (the method involves a moving window). Nevertheless, the fact that the two impedances converge toward each other is evidence that equation (4) holds for maximal power transfer.

Figure 5:
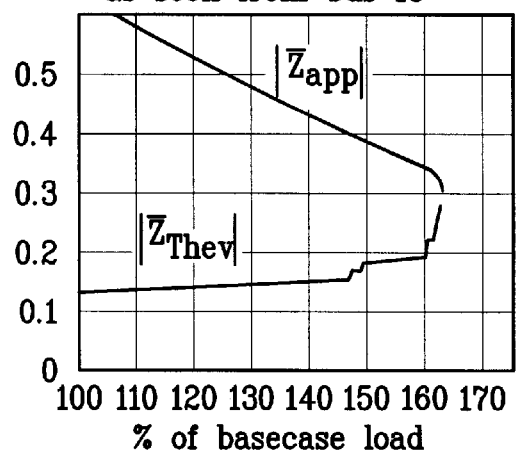
FIG. 5 is a graph similar to FIG. 4 for a base-case load=158+j30 MVA.

The curves for all other load buses share the same characteristic. FIG. 5 shows the results for another bus (Bus #18) as another example.

2.3 Comparison with Conventional Under-voltage Relay

Under-voltage relays provide a simple, cost-effective mitigation of voltage collapse. They "detect" a collapse by comparing the local voltage against a fixed threshold. If the voltage drops and stays below the threshold, then the usual practice is to shed a block of load. Multiple thresholds are possible, and each threshold is linked to a separate block of load.

It is convenient to map the operation of a conventional under-voltage relay to the impedance plane. Consider a relay with a setpoint of 0.95 p.u. Let "V" be the voltage at the local bus and "E" be the voltage of the Thévenin source. One then has:

$$\frac{E}{V} = \frac{E/I}{V/I} = \frac{|\bar{Z}_{app} + \bar{Z}_{Thev}|}{|\bar{Z}_{app}|}$$

For illustration, assume that the Thévenin voltage at the present moment is 1.05 p.u. Then the under-voltage relay operates when $$\frac{|\bar{Z}_{app} + \bar{Z}_{Thev}|}{|\bar{Z}_{app}|} > \frac{1.05}{0.95} = 1.105$$

which represents a circle in the impedance plane. The relative position between such a circle and the Thévenin circle is shown in FIG. 3. The two circles clearly do not coincide. Recall that the Thévenin circle represents maximal power transfer (relation (4)). Thus, wherever the two circles do not overlap represents misoperation of the conventional under-voltage relay. An impedance trajectory such as #1 is yet to reach maximal power transfer, but is treated by the conventional relay as voltage instability. An impedance trajectory such as #2 has clearly reached maximal transfer yet it is not detected by the conventional relay.

2.4 Interpretations

The VIP can be advantageously implemented and viewed as an adaptive relay. Two different interpretations are presented below.

The first interpretation of the VIP is evident from equation (4) and FIG. 2: An impedance relay with a self-tuned setting. Voltage collapse occurs when the load impedance is equal to the Thévenin impedance.

Figure 6:
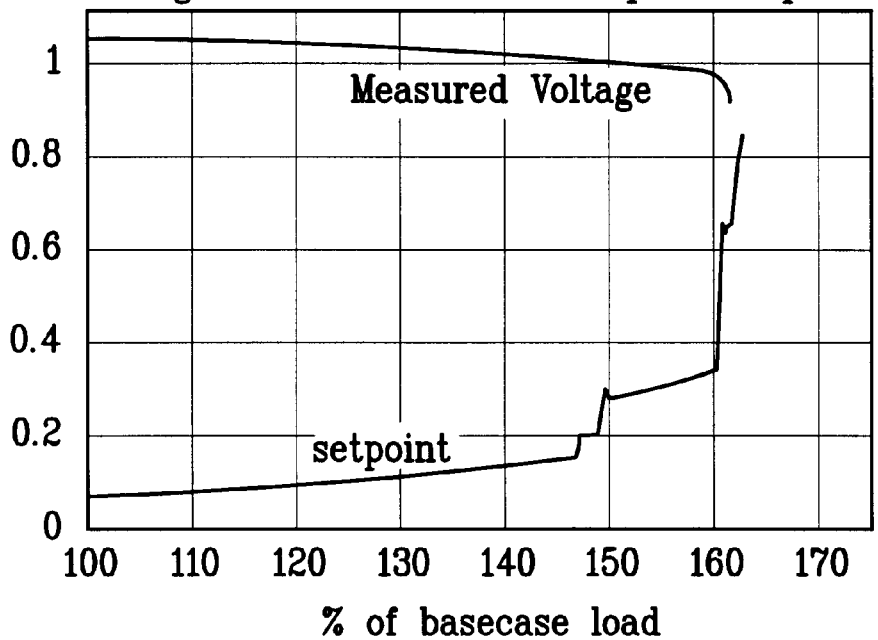
FIG. 6 is an exemplary graph of measured voltage and setpoint versus percent of base-case load.

The second interpretation is based on equation (2), which implies that at the point of collapse the load voltage is equal to the voltage drop across the Thévenin impedance. This interpretation can be seen clearly when one multiplies the two curves in FIG. 4 with the load current profile. The result is shown in FIG. 6. The top curve is associated with the (measured) load voltage, and the bottom curve the (calculated) voltage drop across the Thévenin impedance. If one views the bottom curve as the voltage setpoint of the relay, then clearly the setpoint is tuned so that, at the collapse, the load voltage is equal to the setpoint. Therefore, the monitoring device is a voltage relay with an adaptive setpoint.

2.5 Use of VIP in Load Shedding

It is clear from FIGS. 4, 5 and 6 that the adaptive setpoints (the bottom curve ($|\bar{Z}_{Thev}|$) in each figure) can experience a sharp jump if there is a change in the network structure. (In the examples, the change is a PV-node switched to a PQ-node.) Such a sharp transition poses a challenge with respect to implementation of the VIP. For example, in FIG. 3, the "distance to collapse" is about 0.15 (per unit impedance) when the load level is 160%; however, a slight increase in load cuts this distance to 0.07. This means that it is risky to wait for the distance to drop to zero before issuing control actions.

To use the inventive method most effectively, one should act on the conservative side. That is, one should set a margin and the device should act when the margin is violated. The choice of margin, of course, depends on the bus, and also involves heuristics. For example, one may want to set the margin for bus 23 to be 0.15 (per unit impedance). With this choice, the voltage collapse is "detected" when the load reaches 160%. This impedance-based margin can be converted to power ($I^2Z$), in which case the margin represents the extra megawatts (MW) or MVAR that can be delivered to the bus before voltage collapse can take place. Thus, the load at a bus is deemed excessive when the power margin is violated. Load can be shed so as to restore the margin. Clearly, the amount of load to be shed is not fixed and thus the monitoring device provides a form of adaptive load shedding.

Shedding load to maintain a desired power margin is just one philosophy. Sensitivity-based load shedding is another method whose analysis was given in M. Begovic and A. Phadke, "Control of Voltage Stability Using Sensitivity Analysis," IEEE Trans. on PWRS, February 1992, pp. 114–123. The method was described for a central-control application. In the following paragraph, we provide a variation of the method where local data are used.

Figure 7:
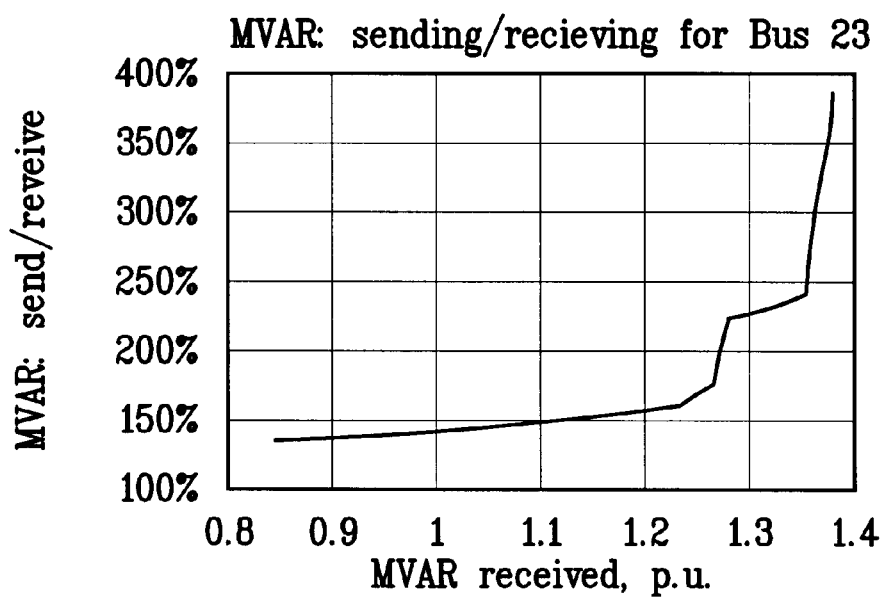
FIG. 7 is an exemplary graph of MVAR supplied by the system versus MVAR consumed at the bus.

One way to determine whether the load is excessive is by comparing the amount of power supplied by the Thévenin source (see FIG. 1) and the power actually consumed at the bus. The case for bus 23 is depicted in FIG. 7. The horizontal axis is the MVAR consumed by the bus (1 p.u.=100 MVA). The vertical axis is the MVAR supplied by the Thévenin source, represented as percentage of the received MVAR. For example, when the MVAR demand at the bus reaches 1.27 p.u., the source has to supply 200% of that amount; that is, for every 2 units sent, 1 is lost in the transmission. This analysis can be used to guide the selection of a threshold.

Figure 8:
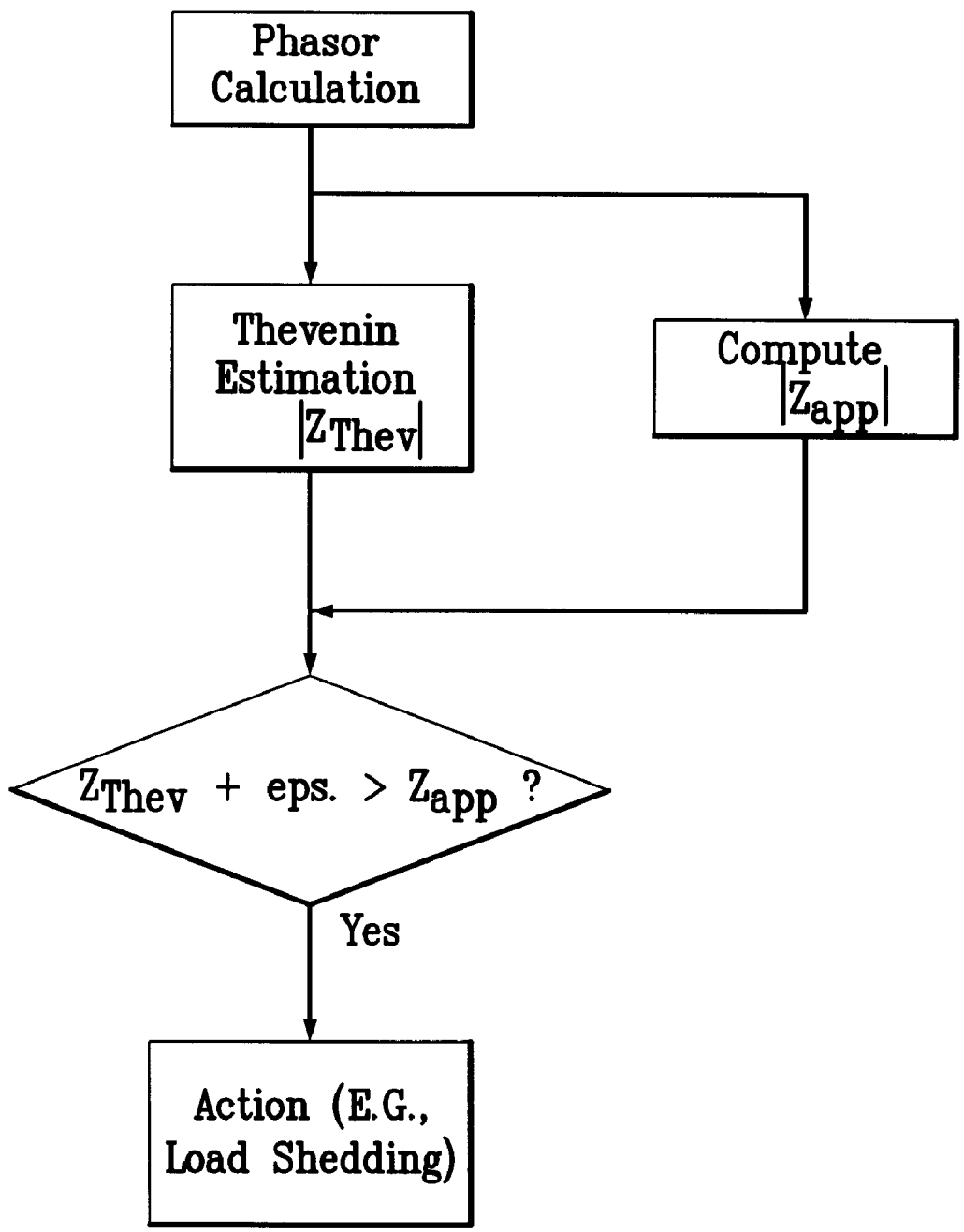
FIG. 8 is a flowchart of the operation of an adaptive relay employing a VIP. The flowchart depicts how local voltage and current measurements are processed to detect proximity to voltage collapse. In the flowchart, $\epsilon \geq 0$ represents a margin that is settable by the user.

The flowchart depicted in FIG. 8 provides a summary of the inventive process described herein. The steps involved include deriving voltage and current phasors ($\overline{V}, \overline{I}$) based on waveform measurements taken at the bus. Next, the magnitudes of the apparent impedance ($|\overline{Z}_{app}|$) and the Thévenin impedance ($|\overline{Z}_{Thev}|$) are determined. These values are then compared to determine whether the proximity of the apparent load impedance to the Thévenin impedance indicates that load shedding or other action should be taken.

2.6 Integration of Local Devices

Figure 9:
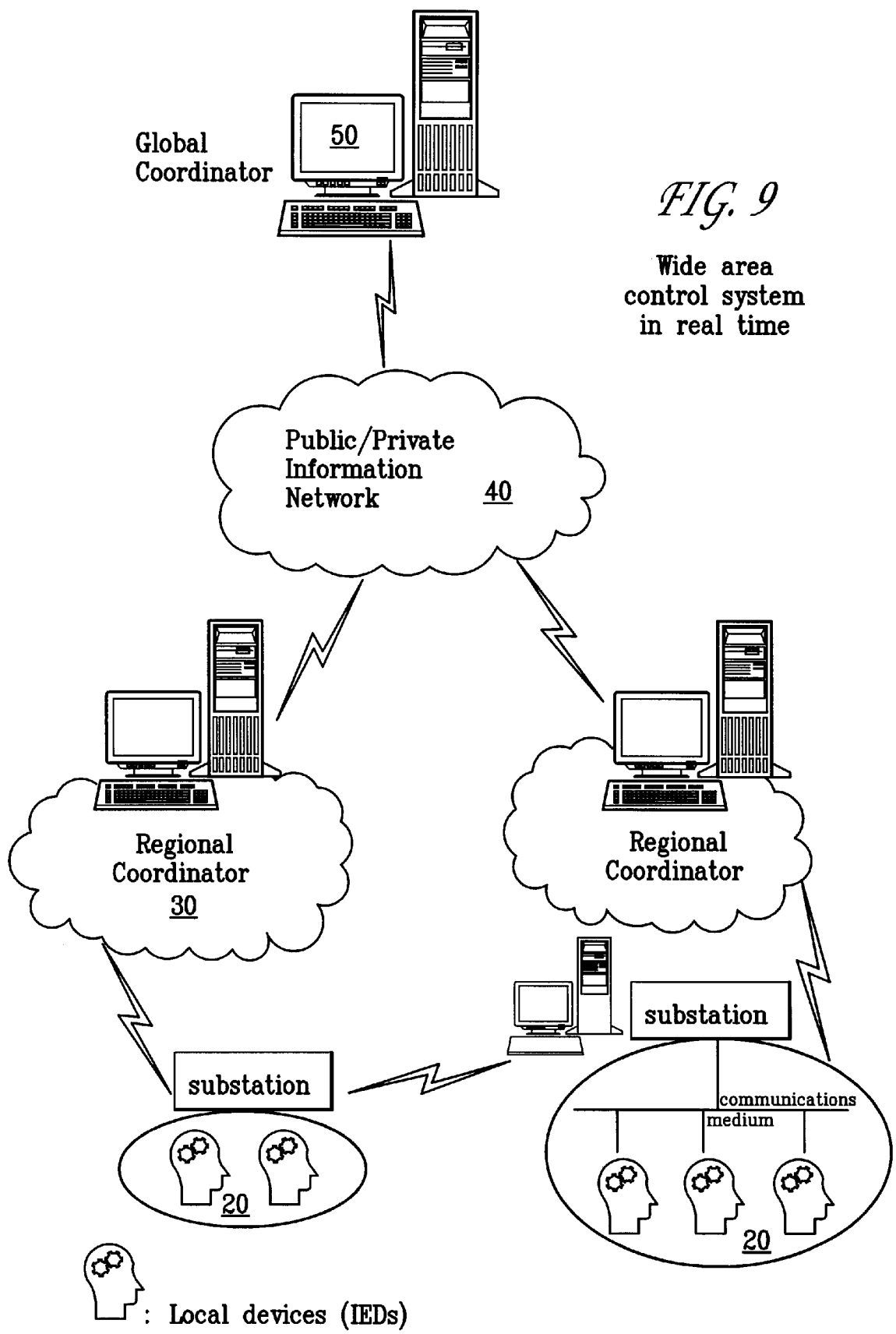
FIG. 9 schematically depicts an inventive system in which VIP-based devices (or Intelligent Electronic Devices (IEDs)) are distributed in a wide area network.

Referring now to FIG. 9, which illustrates how a plurality of local VIP-based devices 20 (also called Intelligent Electronic Devices) may be connected through a wide area network comprising one or more regional control computer (s) 30 and a public or private information network 40 to a global controller/coordinator 50. Such VIP-based monitoring devices processing only local measurements are to be counted upon when other emergency controls fail to mitigate the situation. They also form the fall-back position for any global protection scheme when communications channels fail. The inventive monitoring device identifies the Thévenin equivalent of the network as seen from the local substation. This device can be used to assess the available power margins. The device may be developed so as to be only minimally sensitive to measurement errors. Though better than existing relays that try to achieve the same goal, it still represents an approximation of the network as seen from the local substation.

Should communications to the central computer be available, these monitoring devices can report their findings to the control center, as illustrated in FIG. 9. The central computer combines the reported proximities to collapse and issues coordinating actions. (In this case, the central computer can override the load-shedding decision of individual relays.) Implementing a wide-area protection and control system this way requires modest communications and ensures robustness against missing or wrong data. Even when communication links fail, the local relays can still operate, providing the fallback position.

2.7 Additional Remarks

Tracking stability margins has always been a challenging problem because of nonlinearity. Toward practical applications, a key element that distinguishes one method from another relates to the information required. Most methods in existence today require that system-wide information be available. In contrast, the VIP needs only local information and is thus simpler to build. In addition, since the inventive monitoring device is allowed to control only the local bus, the inherent nonlinearity is of minor practical importance.

Proximity to a steady-state voltage instability can be tracked by estimating the Thévenin equivalent of the network as seen from the local substation. At the point of collapse, the Thévenin impedance is equal to the load's apparent impedance (in the absolute-value sense). This is an important aspect of the VIP. A relay employing the VIP functions like a voltage relay with an adaptive setting.

Potential uses of the VIP include (1) to impose a limit on the loading at each bus and to shed load when the limit is exceeded, and (2) to enhance existing voltage controllers such as static VAR compensators (SVCs). Coordinated control can be obtained if communication links are available, in which case, the output from each monitoring device can be sent to and combined at a central computer for a global decision. In such a multi-level hierarchy, the upper-level control normally takes precedence over local devices; however, in case of emergency, each monitoring device makes its own decision.

B. New Applications and Methods of the VIP

1. Application of the VIP to Non-Radial Topology

As explained above, FIG. 1 shows a load bus and the rest of the system treated as a Thévenin equivalent. It is noted that no assumption has been made about the characteristics of the load, and the apparent impedance $\overline{Z}_{app}$ is merely the ratio between the voltage ($\overline{V}$) and current ($\overline{I}$) phasors measured at the bus.

In the '983 application and above, the VIP method was verified for the standard IEEE 39-bus system at radial system points. This application is useful when there is a clear distinction between the "sink" and the "source", such as the upstream and downstream sides of a distribution (MV) substation. However, typical transmission (high voltage, or HV) networks are highly meshed, making it difficult to locate a radial point. Since tie line (a tie line is an important physical path in the wheeling of power from one geographical region to another) flows are sometimes used as an indicator of voltage collapse, the utility must operate the tie lines below their theoretical limits since equipment outages can be drastically different from what was assumed in off-line computer studies. Thus, there is a need for pushing the limits with a new detection technology, and so we investigate whether the VIP method can be applied to non-radial cases such as transmission networks.

Figure 10:
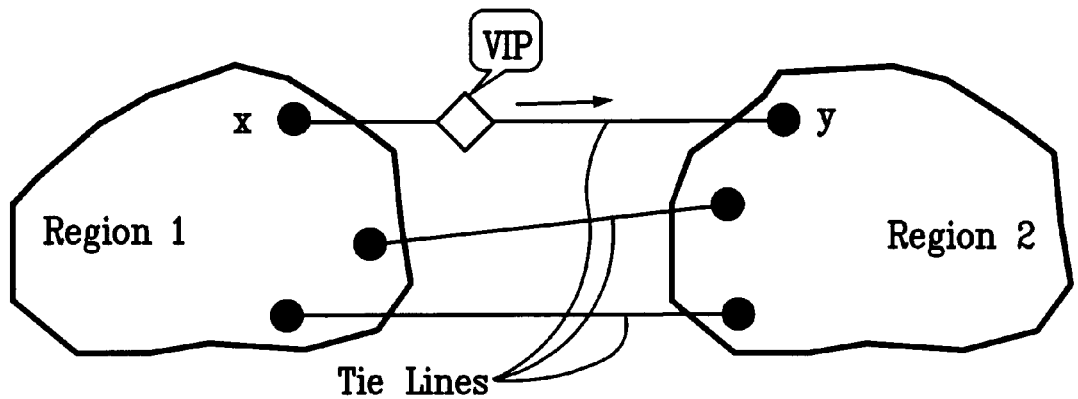
FIG. 10 schematically depicts an application of the VIP to a non-radial topology.

To show the VIP method as described in the '983 application can be placed at non-radial points in the network, consider the network topology in FIG. 10 showing two regions joined by a number of tie lines. A simple transformation will now be performed to reduce the network in FIG. 10 to the system in FIG. 1. This will verify the method in the '983 application can also be applied to non-radial cases.

Figure 11:
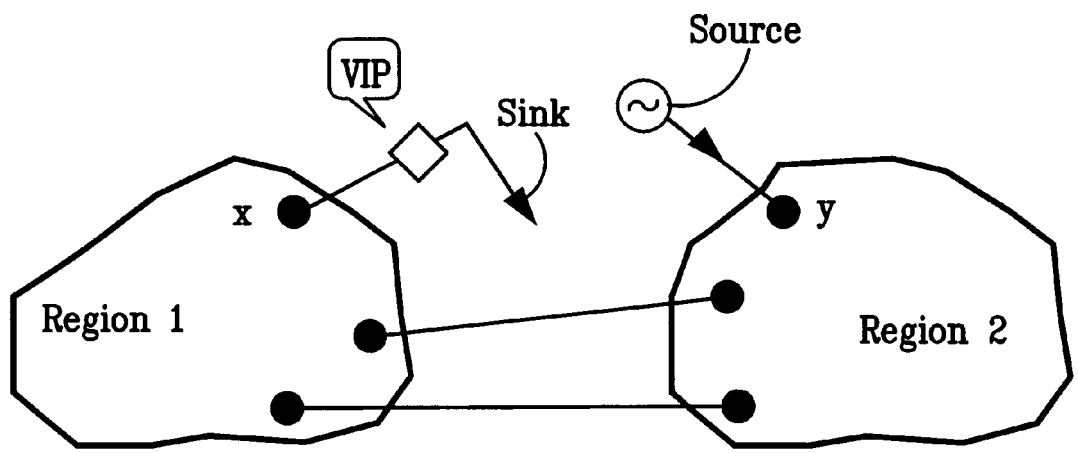
FIG. 11 schematically depicts the arrangement of FIG. 10 with the monitored tie line replaced.

Consider a VIP-based device placed at end "x" of tie line "x-y" in the network of FIG. 10. This site is not a true separation point for a natural source and a natural sink. Assuming the flow on line "x-y" is from "x", a network as shown in FIG. 11, is postulated by replacing line "x-y" with a fictitious sink at "x" and a fictitious source at "y". The sink draws the same power as the flow that leaves node "x" of the physical system while the source provides the same injection as the flow that arrives at node "y" of the physical system.

This replacement guarantees that the two systems have identical nodal voltages and line flows.

As the operating conditions of the physical system in FIG. 10 drifts, the same conditions are replicated in the postulated system in FIG. 11, with the source-link combination continuously tuned. The VIP placed in the physical system observes the same data as the VIP in the postulated system. As for the latter VIP, there is a natural sink—the flow out of "x"—and a natural source, which consists of Regions 1–2, the remaining tie lines, and the fictitious source at "y". Thus, relative to the postulated system, the VIP site fits the situation described in FIG. 1 above. In other words, the VIP can be placed on a tie line to determine whether the flow has reached an insecure level.

In the '983 application, the VIP method was verified using the standard IEEE 39-bus system for the cases of radial placement, such as the one presented in FIG. 1, where there was a clear distinction between the sink and the source. In this patent document, the VIP is tested in a non-radial topology as shown in FIG. 10, on a large system of several thousand nodes. Computer simulations have been performed on the large system with voltage collapse being created by increasing the load demand until the power flow simulations became unsolvable. VIP devices were placed at selected load buses and on tie lines, each processing local measurements (bus voltage and line current) during the simulations.

Figure 12:
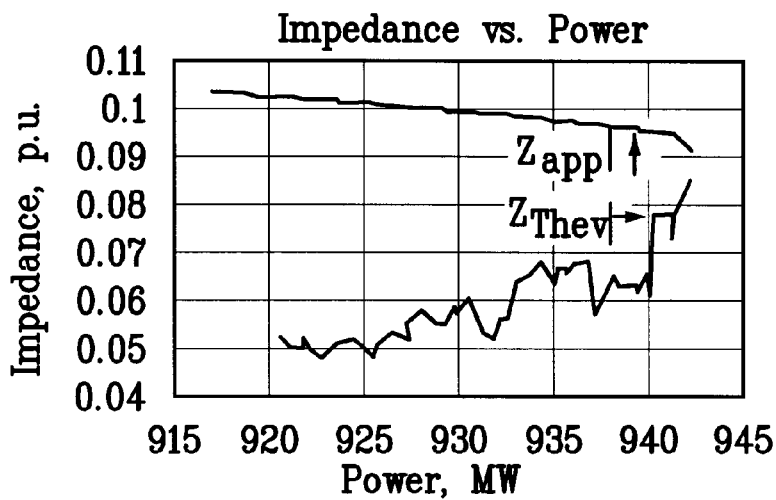
FIG. 12 depicts exemplary impedance profiles, i.e., graphs of impedance versus power.
Figure 13:
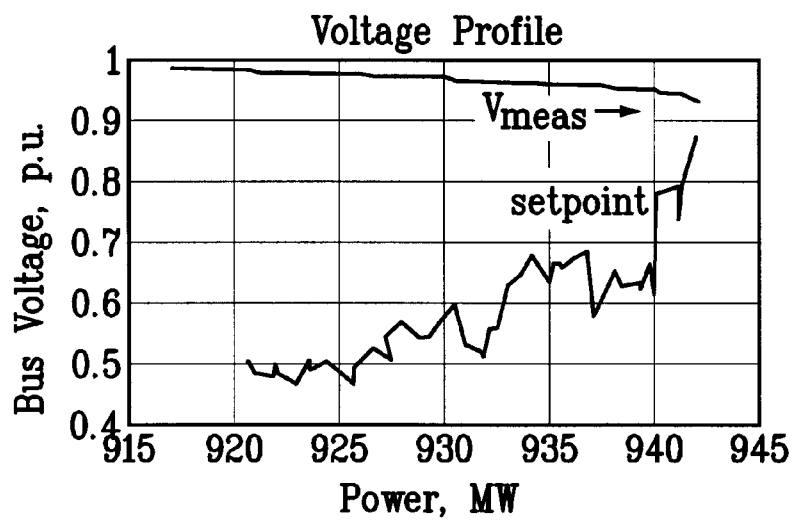
FIG. 13 depicts exemplary voltage profiles, or graphs of bus voltage versus power.

Each of the VIPs monitors the bus voltage and line currents at a tie line during the voltage collapse simulations and reports the results shown in FIG. 12 and FIG. 13. FIG. 12 shows the magnitudes of the apparent and Thévenin impedances (labeled $|Z_{app}|$ and $|Z_{Thev}|$ respectively) as seen at the measurement bus. The load increase in the simulations is evident by the decaying apparent impedance. FIG. 13 shows the value of the measured bus voltage and the calculated voltage drop across the Thévenin impedance (labeled $V_{meas}$ and setpoint respectively). This figure shows that the point of collapse (when the power flow becomes unsolvable) occurs when the quantities become equal. If one views the bottom curve as a voltage setpoint for the VIP, then the device setpoint would be established such that, at the point of voltage collapse, the bus voltage is equal to the setpoint.

As can be seen from voltage profiles in FIG. 13, one can see that the voltage is not a good indicator of system instability since the decay voltage is not very evident at the point of system collapse (power flow simulations became unsolvable). This verifies that the VIP method described in the '983 application can be applied to non-radial cases.

2. Tracking Voltage Collapse Using Rolling Sums

As described in the '983 application, tracking closeness to voltage instability can be accomplished by tracking the distance of the present-time apparent impedance to the Thévenin impedance. One challenge to the VIP is the Thévenin impedance ($\bar{Z}_{Thev}$) is not a fixed quantity because it represents the rest of the system lumped together—a conglomeration of many different electrical entities, any of which can change status at a given time. More likely during problems of voltage instability, Thévenin impedance grows (transmission becoming weaker) and apparent impedance diminishes (load becoming heavier).

In the '983 application, the method of least squares was used to track the Thévenin equivalent. For implementation in an electronic device, least-squares is computationally demanding. This patent document provides a more robust and device-friendly way of tracking Thévenin impedance than presented in the '983 application. (Note that only Thévenin impedance is needed in the prediction of voltage instability.)

Starting with $\bar{E}_{Thev} = \bar{V} + \bar{Z}_{Thev}\bar{I}$, we assume that the Thévenin parameters ($\bar{E}_{Thev}$ and $\bar{Z}_{Thev}$) fluctuate or drift in time. Use subscript n to denote the values at time $t_n$. We have:

$$\bar{E}_{Thev,1} = \bar{V}_1 + \bar{Z}_{Thev,1}\bar{I}_1, \bar{E}_{Thev,2} = \bar{V}_2 + \bar{Z}_{Thev,2}\bar{I}_2, \bar{E}_{Thev,n} = \bar{V}_n + \bar{Z}_{Thev,n}\bar{I}_n \quad (6)$$

Note that in each equation, only the V's and I's are known.

2.1 Data Preprocessing

Multiplying each equation in the set (6) by a coefficient $a_k$ (the choice of a's is to be discussed later) and summing, we obtain:

$$\sum_k a_k \bar{E}_{Thev,k} = \sum_k a_k \bar{V}_k + \sum_k \bar{Z}_{Thev,k} a_k \bar{I}_k \quad (7)$$

Physically, we expect that $\bar{Z}_{Thev}$ fluctuates to a lesser degree than $\bar{E}_{Thev}$. This is because $\bar{E}_{Thev}$ can change if a nearby voltage source changes (e.g., swings). If the coefficients (a's) are chosen so that the left-hand side of equation (7) becomes zero, $\bar{Z}_{Thev}$ can then be estimated as:

$$\bar{Z}_{Thev} = -\frac{\sum a_k \bar{V}_k}{\sum a_k \bar{I}_k} \quad (8)$$

In practice, one can never be sure that the left hand side of (8) can be made zero. Some "engineering judgement" has to be utilized when picking the coefficients a's. Two apparent choices are:

1. Differentiator: the coefficients a's are those of an n-size FIR filter used for numerical differentiation. If n=2, the coefficients are {−1,1}, which perform the conventional consecutive difference.
2. Cosine: the coefficients a's are obtained by taking n equidistant points on the unit circle. In the special case where n=2, the coefficients are again {−1,1}.

Intuitively, the differentiator type is useful when the system drifts slowly, or is subject to random variation. In situations where the Thévenin voltage oscillates, the cosine type is preferred.

We shall use the notation ΔV and ΔI to denote the numerator and denominator of equation (8). Note that in the special case where n=2, ΔV and ΔI are the familiar consecutive differences.

Define:

Trek(I)=rolling sum of ΔI=total distance in the I-plane traveled up to time t.

Trek(V)=rolling sum of ΔV=total distance in the V-plane traveled up to time t.

Figure 14:
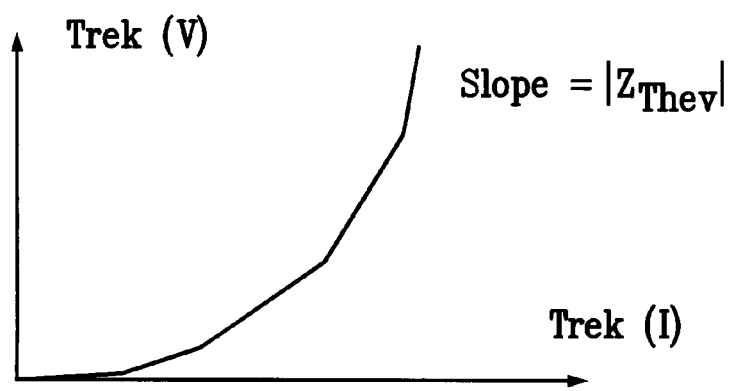
FIG. 14 illustrates an exemplary graph of Trek(V) versus Trek(I), where Trek( ) is a rolling sum function.

Both of these quantities are increasing functions of time. If Trek(V) is plotted against Trek(I), the curve (Trek(V) vs. Trek(I)) of FIG. 14 is obtained. Note that the curve starts at (0,0) and proceeds upward and to the right, with the slope of the curve equal to $Z_{Thev}$. In the illustration, the slope increases gradually. This is a typical situation if we increase the load until system collapses. In arbitrary cases, the slope may not always behave as shown in FIG. 14. The curves may lessen in slope ($Z_{Thev}$ decreases) or the curve may not be continuous.

Data preprocessing refers to the first step of the VIP method, in which Trek(V) and Trek(I) are produced. The Trek(V) vs. Trek(I) curve may look quite smooth in the global view. However, in a blown-up view, the curve can have many jagged edges. The numerical challenge is to produce a smooth estimate of the slope. The smoothing is done in two steps, preliminary smoothing and final smoothing, which are described below.

2.2 Preliminary Smoothing

Figure 15:
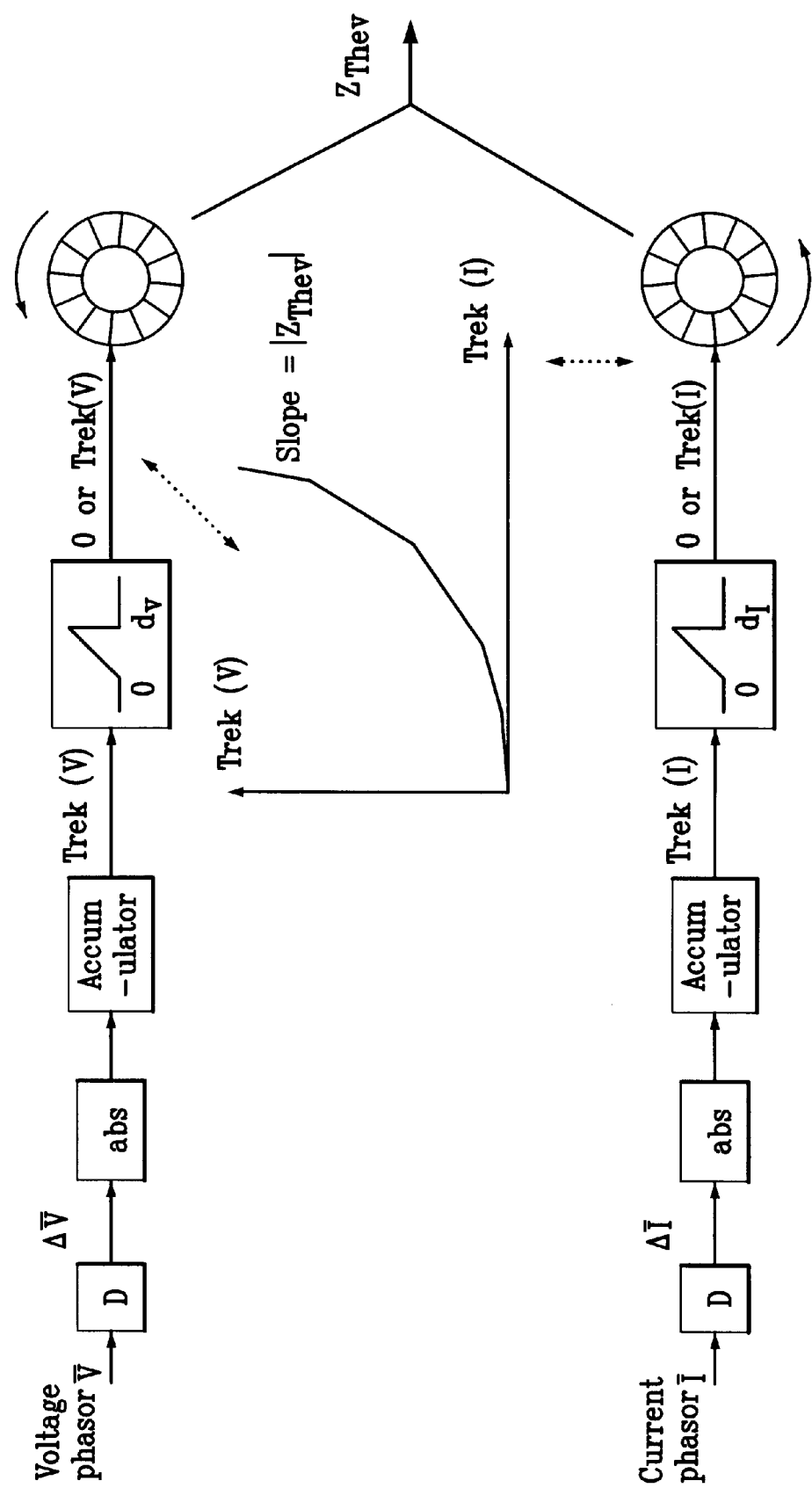
FIG. 15 schematically depicts a data processing circuit for computing Thévenin impedance in accordance with the present invention.

FIG. 15 illustrates the "data preprocessing" step (producing Trek(V) and Trek(I)), followed by the preliminary smoothing. Circular arrays are used to store selected values of Trek(V) and Trek(I) according to the following rules:

Step 0: Let y__ and x__ be the most recent values stored in the circular arrays, voltage and current respectively.

Step 1: Let y=present value of Trek(V); x=present value of Trek(I).

Step 2: If (y−y__) is greater than a prescribed threshold $d_v$ OR if (x−x__) is greater than a prescribed threshold $d_I$, then (a) store both y and x in the respective circular arrays, and (b) continue with Step 3. Otherwise, go to Step 1.

Step 3: Calculate $Z_{Thev}$:

$$Z_{Thev} = \frac{(y - y\_\_)}{(x - x\_\_)} \quad (9)$$

Step 4: Replace y__ and x__ with the most current values of y and x, respectively.

Step 5: Go to Step 1.

2.3 Final Smoothing

Once the circular array has values, the final smoothing is applied in the form of a digital filter as shown in (10):

$$\hat{Z}_{Thev,k} = (b)Z_{Thev,k} + (1-b)\hat{Z}_{Thev,k-1} \quad (10)$$

where, $\hat{Z}_{Thev,k}$ is an estimate of $Z_{Thev}$ at time k, $Z_{Thev,k}$ is calculated as (9) at time k, $\hat{Z}_{Thev,k-1}$ is an estimate of $Z_{Thev}$ at time k−1, and β is a smoothing constant (0≤β≤1).

3. Predicting Voltage Instability in Terms of Power Margins

In the previous sections and the '983 application, the proximity to voltage collapse (or instability) was expressed in terms of the distance between two voltage curves or the distance between two impedance curves. Such distance is somewhat non-intuitive and therefore another measure that is more useful may be used. This new measure, power margin, describes the proximity to collapse in terms of power. Two practical uses for power margin describing the proximity to collapse are given next.

In one use, the VIP is placed at a substation feeding a radial load. The user wants to know how much extra MVA (MVA is the unit of power) can be drawn by the substation before the voltage collapses.

In the other use, the VIP is placed on a tie line (where the tie line is an important physical path in the wheeling of power from one geographical region to another). The user wants to know the how much extra power can be pushed through this tie line before a collapse occurs.

Figure 16:
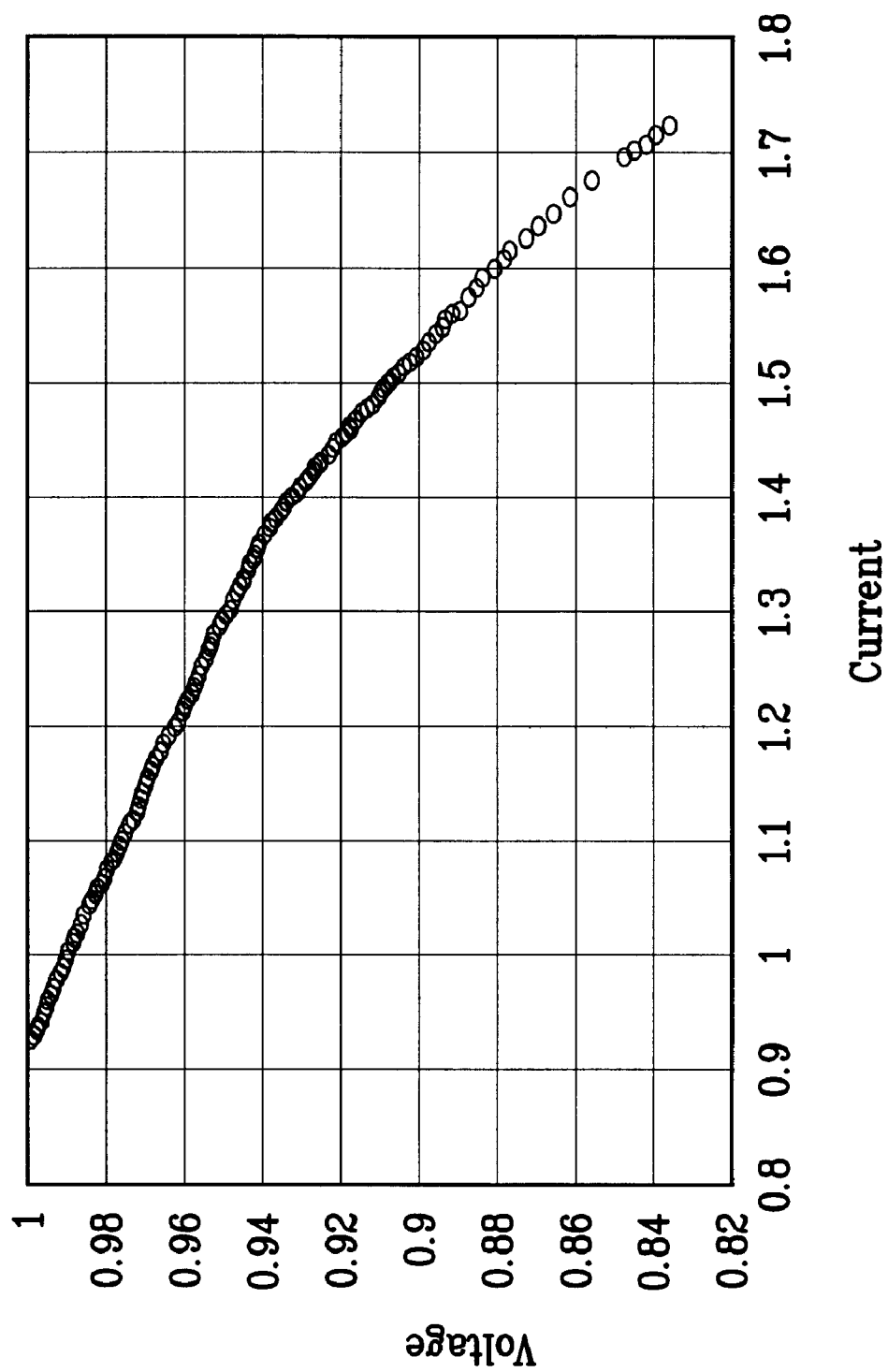
FIG. 16 depicts an exemplary graph of voltage magnitude versus current magnitude.

FIG. 16 shows a scatter plot for V versus I (i.e., voltage magnitude vs. current magnitude). The entire curve is typical for a multi-node system driven to a collapse by a gradual increase of the nodal loads: as the load gets stronger (increase in I), the voltage decreases. The slope of the curve at each point is equal to the value of $-Z_{Thev}$ at the corresponding time instant. In terms of impedance margins, the distance to collapse is the difference between the slope and the ratio V/I. However, as described earlier, an impedance margin is a non-intuitive quantity, and it may be better to address the distance in terms of power margin.

The forecasting method is to be explained with reference to FIG. 17. This figure shows a number of curves and shaded areas:

The dotted curve represents the overall shape of the V-I scattered plot.

The present-time point is labeled "c" which lies on the dotted curve. The data points prior to c are known to the VIP device; the rest of the dotted curve is unknown to the device.

The straight line emanating from c represents the projected behavior of the (V,I) points. The forecast is linear, and is tangent to the recorded data at point c.

"Area abcd" is equal to the power (MVA) observed by the VIP at the present time.

"Area aefg" is the (forecasted) maximum power using the linear forecast. (See below for the calculation.)

The difference, ("Area aefg")−("Area abcd"), is the power margin (power available to be pushed through the VIP location) before the network collapses.

Figure 17:
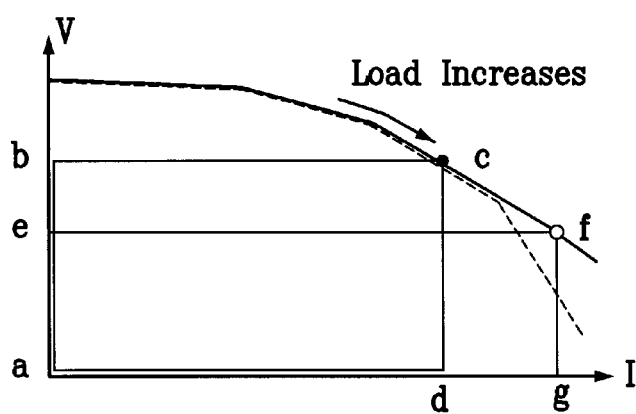
FIG. 17 schematically depicts a method for forecasting available MVA in accordance with the present invention.

FIG. 17 depicts a method for forecasting the available MVA. The MVA margin is the difference ("Area aefg")−("Area abcd").

At the present time, the slope of the scattered plot is calculated. This slope is $-Z_{Thev}$. Let $(V_t, I_t)$ be the measurement at the present time. The linear forecast gives a line of points (V, I) that satisfies the following relation:

$$(V-V_t) = -Z_{Thev}(I-I_t) \quad (11)$$

Thus, for each forecast point (V, I), the power is:

$$S_{forecast} = V \times I = (V_t + Z_{Thev}I_t)I - Z_{Thev}I^2 \quad (12)$$

which is quadratic in the variable I. The maximum value is hence:

$$S_{forecast,MAX} = \frac{(V_t + Z_{Thev}I_t)^2}{4Z_{Thev}} \quad (13)$$

which is illustrated by point f in FIG. 17. The power margin is:

$$\Delta S = S_{forecast,MAX} - V_t \times I_t \quad (14)$$

$$\Delta S = \frac{(V_t + Z_{Thev}I_t)^2}{4Z_{Thev}} - V_t \times I_t$$

$$\Delta S = \frac{(V_t + Z_{Thev}I_t)^2}{4Z_{Thev}}$$

3.1 How Accurate Is the Forecast Margin?

The forecast margin is computed based on linear extrapolation of recorded data. The forecast is exact if the Thévenin equivalent stays unchanged. With reference to FIG. 17, the "forecast" line remains coincide with the "true future" line (dotted) for some time after the present time. Thus for the near term, the forecast power "Area aefg" remains unchanged and is a good estimate. However, as soon as the "true future" curve makes a turn, a new forecast line must be built, and this would change the value of "Area aefg". The new value for "Area aefg" will be smaller than the old one. In other words, the forecast is always optimistic, but as the system is getting more and more loaded, the forecast becomes more accurate.

3.2 Improving the Forecast Using History Data

The linear forecast as described above is used when the VIP has no knowledge of the loading beyond its present loading. However, if the loading beyond its present point has been encountered in the past, the VIP can produce more accurate margins. For example, the entire dotted line in FIG. 17 could have been available in the memory of the VIP device due to data experienced some days ago. The large dot still represents the present-time data. Instead of using the linear forecast ("Area aefg"), the VIP can use the dotted curve as the forecast.

3.3 Power Margin Testing

To test the concept of power margins as previously discussed, computer simulations were again performed on a large system with voltage collapse being created by simulating a set of multiple contingencies including loss of generation and loss of vital transmission lines over a period of time, until the simulations break down numerically (system loses stability). VIP devices were placed at selected load buses and on tie lines, each processing local measurements (bus voltage and line current) during the simulations.

The system was simulated in steady state conditions for 0.5 seconds when the first contingency was applied of simultaneous line outages. The next contingency (loss of generation) was applied at 12 seconds with sequential contingencies (line outages) occurring every 10 seconds afterward (22 sec., 32 sec., etc.) until the system reaches instability at 52 seconds.

Figure 18:
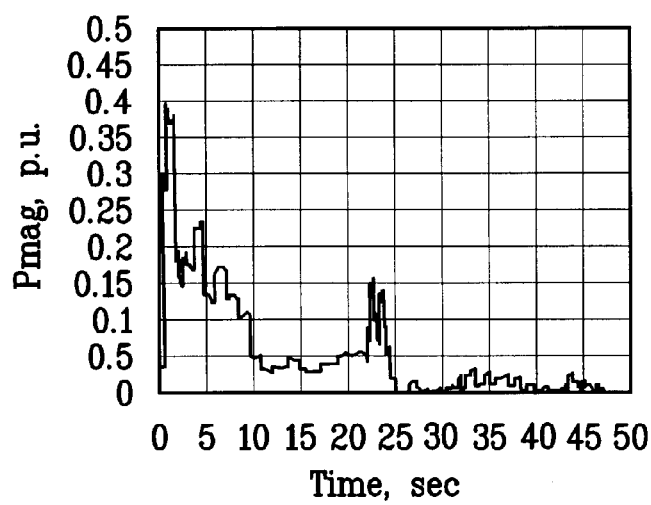
FIG. 18 depicts an exemplary graph of power margin versus time.
Figure 19:
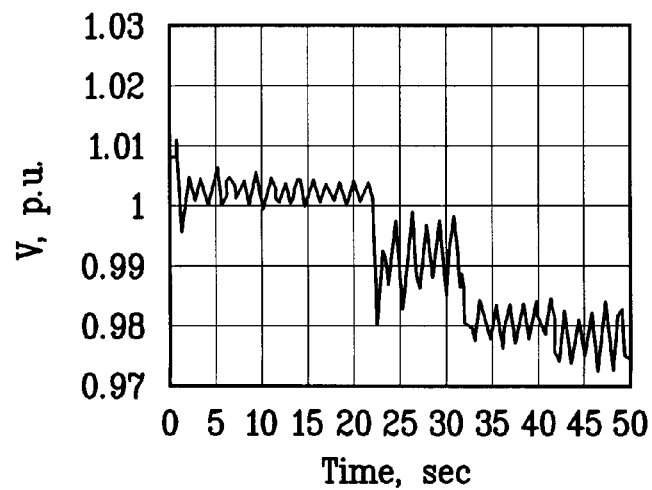
FIG. 19 depicts an exemplary voltage profile, i.e., a graph of voltage versus time.

The VIP monitors the bus voltage and line currents at a tie-line bus during the collapse simulations and reports the results shown in FIG. 18. As can be seen from the figure, the VIP predicts the system to become unstable at approximately t=25 seconds when the power margin becomes zero. Comparing this time with the voltage profile in FIG. 19, one can again see the voltage is not a good indicator of system instability. As discussed at the beginning of this section, the system does become unstable (simulations break down numerically) at t=52 seconds.

The above description of presently preferred embodiments of the invention is not intended to limit the scope of protection of the following claims. Thus, for example, except where they are expressly so limited, the following claims are not limited to applications involving three-phase power systems or power systems employing a 50 Hz or 60 Hz fundamental frequency. Moreover, the claims are not limited to relays associated with any particular part (i.e., transformer, feeder, high power transmission line, etc.) of a power system. In fact, the VIP can also be coded into many types of microprocessor-based controllers. One example is to control on-load tap-changing (OLTC) transformers. Such transformers tend to drain the reactive power from the system to support the voltage on the load side. If the VIP is placed on the supply side of the transformer, the VIP can detect when the drain becomes excessive, and thus the decision to block the OLTC can be carried out. Another exemplary use of the present invention is to enhance the performance of SVCs by adding voltage-collapse prediction. Traditionally, SVC behavior can mask an imminent collapse, leading to sudden and unexpected loss of power supply. The VIP can be used to ensure accurate collapse prediction, taking into account the SVC operation.

We claim:

1. A method for protecting an electrical power system, comprising the acts of:
   (a) measuring current and voltage phasors at a point on the system;
   (b) based on the current and voltage phasors, determining an apparent impedance ($\overline{Z}_{app}$) associated with a load region and a Thévenin impedance ($\overline{Z}_{Thev}$) associated with a source region, wherein $\overline{Z}_{Thev}$ is tracked using a ratio of a rolling sum of voltage (Trek(V)) to a rolling sum of current (Trek(I));
   (c) comparing the Thévenin impedance and apparent impedances; and
   (d) deciding whether to initiate a prescribed action based on the relationship of the apparent impedance to the Thévenin impedance.

2. A method as recited in claim 1, wherein said prescribed action is load shedding.

3. A method as recited in claim 1, wherein said prescribed action is controlling on-load tap-changing (OLTC) transformers.

4. A method as recited in claim 1, wherein said prescribed action is initiated if a difference between the magnitudes of the Thévenin impedance and apparent impedance is less than a predetermined amount.

5. A method as recited in claim 1, wherein the apparent impedance represents a ratio between the voltage and current phasors.

6. A method as recited in claim 1, wherein the method is applied to a non-radial power system topology.

7. A method as recited in claim 6, wherein the non-radial topology includes a tie line coupling the source region to the load region, and the method is applied by detecting voltage instability at a point on the tie line.

8. A method as recited in claim 1, wherein Trek(V) is computed as Trek(V)=$\Sigma a_k V_k$ and Trek(I) is computed as Trek(I)=$\Sigma a_k I_k$, wherein k is an index related to measurement times, $a_k$ are coefficients, and $V_k$ are values of voltage measured at the point on the system.

9. A method as recited in claim 8, wherein the coefficients ($a_k$) are selected in accordance with an n-size FIR filter, where n is an integer.

10. A method as recited in claim 8, wherein the coefficients ($a_k$) are selected by taking n equidistant points on a unit circle, where n is an integer.

11. A method as recited in claim 8, further comprising a preliminary smoothing step.

12. A method as recited in claim 11, wherein the preliminary smoothing step comprises the following steps:
   Step 0: Let y__ and x__ be the most recent values stored in the circular arrays, for voltage and current respectively;
   Step 1: Let y=present value of Trek(V); x=present value of Trek(I);
   Step 2: If (y−y__) is greater than a prescribed threshold $d_V$ or if (x−x__) is greater than a prescribed threshold $d_I$ then (a) store both y and x in respective circular arrays, and (b) continue with Step 3; otherwise, go to Step 1;
   Step 3: Calculate $Z_{Thev}$:

$$Z_{Thev} = \frac{(y - y\_\_)}{(x - x\_\_)}$$

Step 4: Replace y__ and x__ with the most current values of y and x, respectively;
   Step 5: Go to Step 1.

13. A method as recited in claim 1, further comprising a digital filtering step.

14. A method as recited in claim 13, wherein the digital filtering step comprises the following computation:

$$\hat{Z}_{Thev,k} = (\beta) Z_{Thev,k} + (1-\beta) \hat{Z}_{Thev,k-1}$$

where,
$\hat{Z}_{Thev,k}$ is an estimate of $Z_{Thev}$ at time k,
$\hat{Z}_{Thev,k-1}$ is an estimate of $Z_{Thev}$ at time k−1, and
$\beta$ is a smoothing constant having a value in the range of $0 \leq \beta \leq 1$.

15. A method for protecting an electrical power system, comprising the acts of:

(a) measuring current and voltage at a point on the system;
(b) based on the current and voltage measurements, determining a Thévenin impedance associated with a source region, and determining a power margin in accordance with a prescribed formula, wherein $\overline{Z}_{Thev}$ is tracked using a ratio of a rolling sum of voltage (Trek(V)) to a rolling sum of current (Trek(I)); and
(c) deciding whether to initiate a prescribed action based on the power margin.

16. A method as recited in claim 15, wherein the power margin is determined in accordance with the following process:

obtaining data representing voltage and current at a plurality of points in time;

determining the power observed at the present time;

forecasting a maximum available power at a future time, based on the plurality of data points;

computing a difference between the forecasted maximum available power and the observed current power; and defining the power margin based on the computed difference.

17. A method as recited in claim 15, wherein said prescribed action is load shedding.

18. A method as recited in claim 15, wherein said prescribed action is controlling on-load tap-changing (OLTC) transformers.

* * * * *